United States Patent
Liu et al.

(10) Patent No.: US 12,188,879 B2
(45) Date of Patent: Jan. 7, 2025

(54) DETECTION METHOD OF WRINKLE DEGREE OF SCREEN AND VISUAL DETECTION DEVICE

(71) Applicant: Wuhan China Star Optoelectronics Semiconductor Display Technology Co., Ltd., Hubei (CN)

(72) Inventors: Yali Liu, Hubei (CN); Yongzhen Jia, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/621,241

(22) PCT Filed: Nov. 25, 2021

(86) PCT No.: PCT/CN2021/133129
§ 371 (c)(1),
(2) Date: Dec. 21, 2021

(87) PCT Pub. No.: WO2023/087356
PCT Pub. Date: May 25, 2023

(65) Prior Publication Data
US 2024/0027362 A1  Jan. 25, 2024

(30) Foreign Application Priority Data
Nov. 17, 2021 (CN) .......... 202111360140.6

(51) Int. Cl.
*G01N 21/95* (2006.01)
*G06T 7/00* (2017.01)
*G06T 7/64* (2017.01)

(52) U.S. Cl.
CPC .......... *G01N 21/95* (2013.01); *G06T 7/0002* (2013.01); *G06T 7/64* (2017.01)

(58) Field of Classification Search
None
See application file for complete search history.

(56) References Cited

U.S. PATENT DOCUMENTS

2012/0105604 A1* 5/2012 Lim ............ H04N 17/04
348/51
2012/0127480 A1  5/2012 Pilloud et al.
(Continued)

FOREIGN PATENT DOCUMENTS

CN  110208287  9/2019
CN  110736751  1/2020
(Continued)

OTHER PUBLICATIONS

"Tips for Shooting in Cold Weather" (https://www.nikonusa.com/en/learn-and-explore/a/tips-and-techniques/tips-for-shooting-in-cold-weather.html#:~:text=Most%20of%20today's%20digital%20cameras,Antarctica%20you%20should%20be%20fine) (Year: 2024).*

*Primary Examiner* — Xiaolan Xu

(57) ABSTRACT

The present application provides a detection method of a wrinkle degree of a screen and a visual detection device, the detection method includes: providing detection rays and irradiating the detection rays vertically onto a surface to be measured of a folding screen by an optical element; acquiring detection rays vertically reflected by the surface to be measured of the folding screen to obtain a corresponding light source reflection image; analyzing the light source reflection image to obtain an evaluation index of a wrinkle degree of the folding screen; and evaluating the wrinkle degree of the folding screen.

20 Claims, 10 Drawing Sheets

(56) References Cited

U.S. PATENT DOCUMENTS

| | | | |
|---|---|---|---|
| 2019/0287237 A1* | 9/2019 | de Bonfim Gripp | G06T 7/64 |
| 2020/0158497 A1* | 5/2020 | Arnoult | G01B 11/2513 |
| 2020/0184620 A1 | 6/2020 | Biernacki | |
| 2022/0397675 A1* | 12/2022 | Arioua | G01S 7/4802 |
| 2023/0266233 A1* | 8/2023 | Pahk | G02B 27/286 |

FOREIGN PATENT DOCUMENTS

| | | |
|---|---|---|
| CN | 112212812 | 1/2020 |
| CN | 111487316 | 8/2020 |
| CN | 112086032 | 12/2020 |
| CN | 113299213 | 8/2021 |
| JP | 2005-337857 | 5/2022 |
| TW | 200907330 | 2/2009 |

* cited by examiner

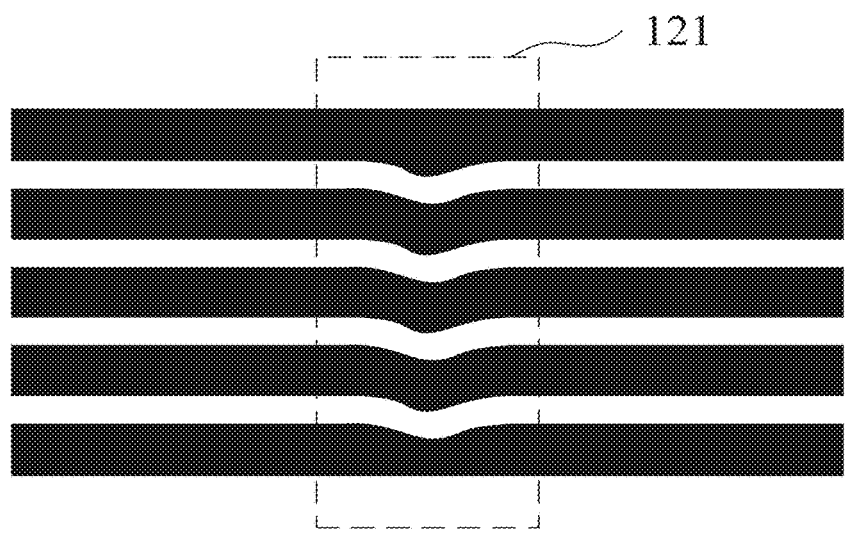
FIG. 12
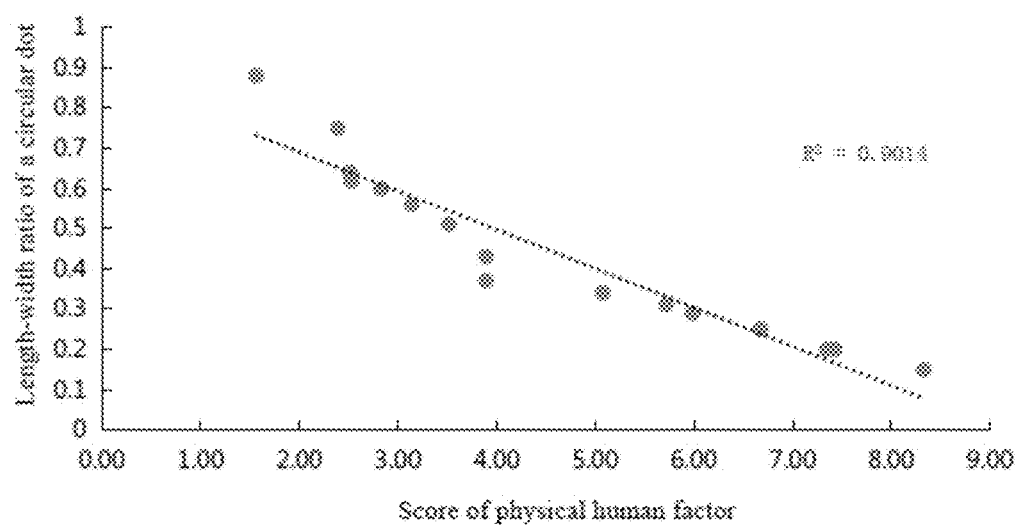
FIG. 13
| Number of bending | 0 | 1k | 2k | 5k |
|---|---|---|---|---|
| Light source reflection image | | | | |
| Average deformation length-width ratio | 1.167 | 0.555 | 0.519 | 0.368 |
FIG. 14

DETECTION METHOD OF WRINKLE DEGREE OF SCREEN AND VISUAL DETECTION DEVICE

RELATED APPLICATIONS

This application is a National Phase of PCT Patent Application No. PCT/CN2021/133129 having International filing date of Nov. 25, 2021, which claims the benefit of priority of Chinese Patent Application No. 202111360140.6 filed on Nov. 17, 2021. The contents of the above applications are all incorporated by reference as if fully set forth herein in their entirety.

FIELD AND BACKGROUND OF THE INVENTION

The present application relates to a display field, in particular to a detection method of a wrinkle degree of a screen and a visual detection device.

After a flexible folding screen is folded many times or placed for a long time, a surface of the screen will produce irreversible wrinkles. At present, wrinkles of the screen are mainly measured by the height difference method in the industry. The larger a height difference, the more obvious the wrinkles of the screen. However, there is a problem that a detection result obtained by the height difference measurement method does not match a visual observation effect of human eyes.

Therefore, there is a need to develop a measurement method that matches visual perception results of human eyes, to detect a wrinkle degree of the screen of the flexible folding screen.

SUMMARY OF THE INVENTION

The present application provides a detection method of a wrinkle degree of a screen and a visual detection device in a case of frontal observation to obtain a detection result of the wrinkle degree of the screen matching a visual perception result of human eyes.

The present application provides a detection method of a wrinkle degree of a screen, the method comprising following steps:
  providing detection rays, and irradiating the detection rays vertically onto a surface to be measured of a folding screen using an optical element;
  acquiring detection rays vertically reflected by the surface to be measured of the folding screen to obtain a corresponding light source reflection image;
  analyzing the light source reflection image to obtain an evaluation index of a wrinkle degree of the folding screen; and
  evaluating the wrinkle degree of the folding screen.

Alternatively, in some embodiments of the present application, the optical element is a beam splitter.

Alternatively, in some embodiments of the present application, the step of irradiating the detection rays vertically onto the surface to be measured of the folding screen using the optical element comprises:
  irradiating the detection rays onto the beam splitter; and
    transmitting a portion of the detection rays with the beam splitter and
    reflecting a remaining portion of the detection rays to the folding screen; wherein detection rays reflected to the folding screen is perpendicular to the surface to be measured of the folding screen.

Alternatively, in some embodiments of the present application, the detection rays irradiate the beam splitter at an angle of 45°.

Alternatively, in some embodiments of the present application, the step of acquiring detection rays vertically reflected by the surface to be measured of the folding screen to obtain a corresponding light source reflection image comprises:
  vertically reflecting the detection rays reflected to the folding screen back to the beam splitter using the surface to be measured of the folding screen;
  reflecting, by the beam splitter, a portion of detection rays reflected back to the beam splitter, and transmitting, by the beam splitter, a remaining portion of the detection rays reflected back to the beam splitter; and
  acquiring, by a camera, detection rays transmitted by the beam splitter, and imaging according to acquired detection rays to obtain the corresponding light source reflection image.

Alternatively, in some embodiments of the present application, the light source providing the detection rays is a circular dot light-spot, a radius size of a light-spot circular dot of the circular dot light-spot ranges from 1 mm to 3 mm, and a minimum distance between two adjacent light-spot circular dots ranges from 1 mm to 3 mm.

Alternatively, in some embodiments of the present application, the step of analyzing the light source reflection image to obtain the evaluation index of the wrinkle degree of the folding screen comprises:
  obtaining a length-width ratio of each of light-spot circular dots in the light source reflection image by using an image algorithm; wherein a length of the light-spot circular dot is a maximum size of the light-spot circular dot in a direction perpendicular to a creasing direction of the folding screen, and a width of the light-spot circular dot is a maximum size of the light-spot circular dot in a direction parallel to the creasing direction of the folding screen; and
  extracting a minimum value of length-width ratios as the evaluation index of the wrinkle degree of the folding screen.

Alternatively, in some embodiments of the present application, the step of analyzing the light source reflection image to obtain the evaluation index of the wrinkle degree of the folding screen comprises:
  obtaining a length-width ratio of each of light-spot circular dots in the light source reflection image using an image algorithm; wherein a length of the light-spot circular dot is a maximum size of the light-spot circular dot in a direction perpendicular to a creasing direction of the folding screen, and a width of the light-spot circular dot is a maximum size of the light-spot circular dot in a direction parallel to the creasing direction of the folding screen; and
  calculating an average deformation length-width ratio of deformed light-spot circular dots, wherein the average deformation length-width ratio is the evaluation index of the wrinkle degree of the folding screen.

Alternatively, in some embodiments of the present application, the light source providing the detection rays is a stripe light-spot, the stripe light-spot has a size ranging from (1 mm×1 mm) to (3 mm×3 mm), and a gap between two adjacent light-spot stripes ranges from 1 mm to 3 mm.

Alternatively, in some embodiments of the present application, the step of analyzing the light source reflection image to obtain the evaluation index of the wrinkle degree of the folding screen comprises:

obtaining a rank of the light source reflection image by using an image algorithm, wherein the rank is the evaluation index of the wrinkle degree of the folding screen; wherein a direction along which the light-spot stripe of the stripe light-spot extends is parallel to a creasing direction of the folding screen.

Alternatively, in some embodiments of the present application, the step of analyzing the light source reflection image to obtain a crease degree evaluation index of the folding screen comprises:

obtaining deformation curvatures of the light-spot stripes in the light source reflection image by an image algorithm; wherein a direction along which the light-spot stripe of the stripe light-spot extends is perpendicular to a creasing direction of the folding screen; and extracting a maximum value of the deformation curvatures as the evaluation index of the wrinkle degree of the folding screen.

Alternatively, in some embodiments of the present application, the step of analyzing the light source reflection image to obtain the evaluation index of the wrinkle degree of the folding screen comprises:

obtaining deformation curvatures of the light-spot stripes in the light source reflection image by an image algorithm; wherein a direction along which the light-spot stripe of the stripe light-spot extends is perpendicular to a creasing direction of the folding screen; and calculating an average deformation curvature, wherein the average deformation curvature is the evaluation index of the wrinkle degree of the folding screen.

Alternatively, in some embodiments of the present application, the folding screen is in a blank screen state.

Alternatively, in some embodiments of the present application, a test environment is a dark state, a test temperature is 5° C.±3° C., a test humidity is between 25% and 85%, and a test pressure is between 86 kPa and 106 kPa.

Accordingly, an embodiment of the present application further provides a visual detection device for implementing respective steps of a detection method of a wrinkle degree of a screen, wherein the detection method of the wrinkle degree of the screen comprises:

providing detection rays, and irradiating the detection rays vertically onto a surface to be measured of a folding screen using an optical element;

acquiring detection rays vertically reflected by the surface to be measured of the folding screen to obtain a corresponding light source reflection image;

analyzing the light source reflection image to obtain an evaluation index of a wrinkle degree of the folding screen; and evaluating the wrinkle degree of the folding screen, the visual detection device comprises:

a stage for carrying an object to be detected;

a light source for providing detection rays;

a camera disposed above the stage for acquiring detection rays vertically reflected by a surface to be measured of the object; and an optical element for vertically irradiating the detection rays onto the surface to be measured of the object.

Alternatively, in some embodiments of the present application, the light source is provided above the stage, and an included angle of 45° is formed between a light emitting surface of the light source and the optical element.

Alternatively, in some embodiments of the present application, the optical element is a beam splitter.

Alternatively, in some embodiments of the present application, the beam splitter is a plane beam splitter.

Alternatively, in some embodiments of the present application, the light source comprises a circular dot light-spot and a stripe light-spot.

Alternatively, in some embodiments of the present application, the object is a folding screen, and a direction along which a light-spot stripe of the stripe light-spot extends is parallel to or perpendicular to a creasing direction of the folding screen.

The present application provides a detection method of a wrinkle degree of a screen and a vision detection apparatus, the detection method comprising: providing detection rays, and irradiating the detection rays vertically onto a surface to be measured of a folding screen by an optical element; acquiring detection rays vertically reflected by the surface to be measured of the folding screen to obtain a corresponding light source reflection image; analyzing the light source reflection image to obtain an evaluation index of a wrinkle degree of the folding screen; and evaluating the wrinkle degree of the folding screen. the optical element is used to change the detection light path of the detection rays, so as to simulate the application scene of the human eyes observing folding screen from the front, an image algorithm analysis is performed on the acquired light source reflection image to obtain an evaluation index of a wrinkle degree of the folding screen matching the visual effect of human eye, which solves the problem that the conventional measurement method of the wrinkle degree of the folding screen does not match the visual perception result of human eye in the scene of frontal observation.

BRIEF DESCRIPTION OF THE SEVERAL VIEW OF THE DRAWINGS

The technical solutions and other beneficial effects of the present application will be apparent by describing the specific implementations of the present application in detail below in conjunction with the accompanying drawings.

FIG. 12 is a schematic diagram of a third light source reflection image according to an embodiment of the present application.

FIG. 13 is a fitting diagram of a first evaluation index of a wrinkle degree and a human factor experiment according to an embodiment of the present application.

FIG. 14 is a graph showing a variation of a first light source reflection image and an evaluation index of a wrinkle with the increase of a number of bending according to an embodiment of the present application.

DESCRIPTION OF SPECIFIC EMBODIMENTS OF THE INVENTION

In view of the following problem in an existing height difference measurement method to detect a screen wrinkle degree of a foldable screen: a detection result does not match a visual observation effect of human eyes, the present application provides a visual detection device and a method of detecting a screen wrinkle degree implemented by the visual detection device, which may be used to solve this problem.

Figure 1:
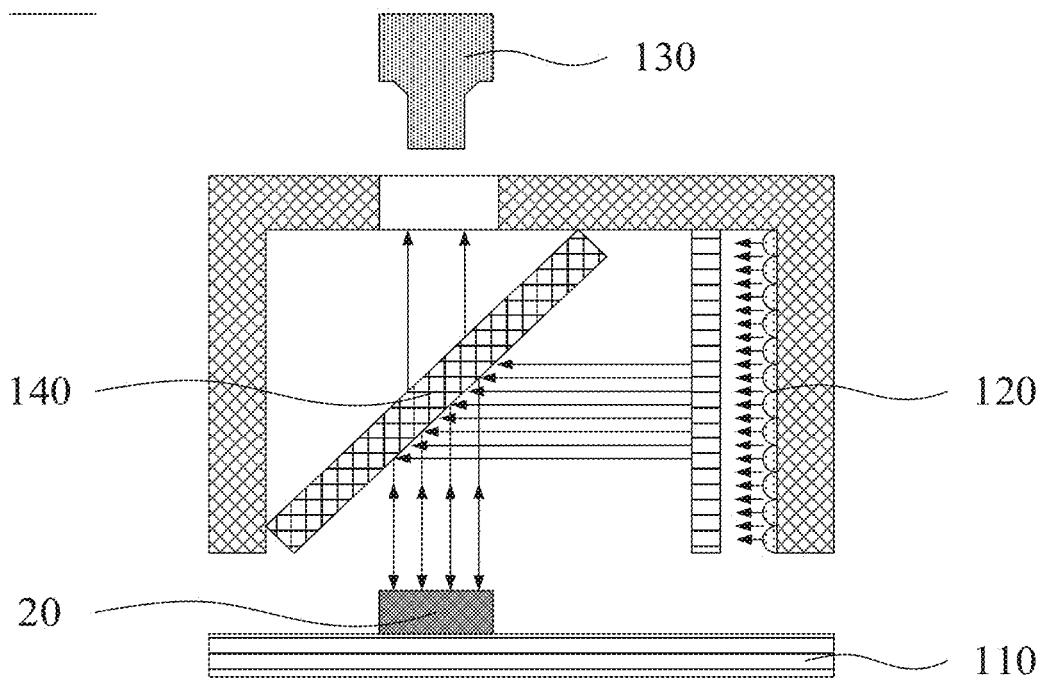
FIG. 1 is a schematic structural diagram of a visual detection device according to an embodiment of the present application.

In an embodiment, referring to FIG. 1, the visual detection device 10 provided by an embodiment of the present application includes:
 a stage 110 for carrying an object 20 to be detected;
 a light source 120 for providing detection rays;
 a camera 130 disposed above the stage 110 and used to acquire detection rays vertically reflected from a surface to be measured of the object 20; and
 an optical element 140 for making the detection rays irradiate the surface to be measured of the object 20 perpendicularly.

In an embodiment, the optical element 140 is a beam splitter. Specifically, when detection is performed on the object 20, among the detection rays emitted by the light source 120, a part of the detection rays pass through the beam splitter 140, a remaining part of the detection rays are reflected by the beam splitter 140 to the object 20, and the detection rays reaching the object 20 are reflected again by the surface of the object 20 to the beam splitter 140. Then, among the detection rays reaching the beam splitter 140, a part of the detection rays are reflected by the beam splitter 140, and a remaining part of the detection rays pass through the beam splitter 140 to reach the camera 130.

In an embodiment, an included angle of 45° is formed between the light emitting surface of the light source 120 and the beam splitter 140, and an included angle of 45° is formed between the beam splitter 140 and the stage 110. When the detection is performed on the object 20, among the detection rays emitted from the light source 120, half of the detection rays pass through the beam splitter 140, another half of the detection rays are reflected by the beam splitter 140 to the object 20, and the detection rays reaching the object 20 is reflected again by the surface of the object 20 to the beam splitter 140. Then, among the detection rays reaching the beam splitter 140, half of the detection rays are reflected by the beam splitter 140, and another half of the detection rays pass through the beam splitter 140 to reach the camera 130 disposed directly above the object 20.

In an embodiment, the beam splitter 140 is a plane beam splitter.

In an embodiment, the light source 120 includes a circular dot light-spot and a stripe light-spot.

In an embodiment, the detection rays reaching the object 20 to be detected completely covers the object 20 to be detected.

In an embodiment, a projection of the beam splitter 140 on a plane where the light source 120 is located completely covers the light source 120.

In an embodiment, the projection of the beam splitter 140 on the stage 110 completely covers the stage 110.

An embodiment of the present application further provides a detection method of a wrinkle degree of a screen, the steps of the detection method are implemented by the visual detection device as shown in FIG. 1 provided by the embodiment of the present application. A test environment of the detection method provided in the embodiment of the present application is a dark state, a test temperature is 5° C.±3° C., a test humidity is between 25% and 85%, and a test pressure is between 86 kPa and 106 kPa.

Figure 2:
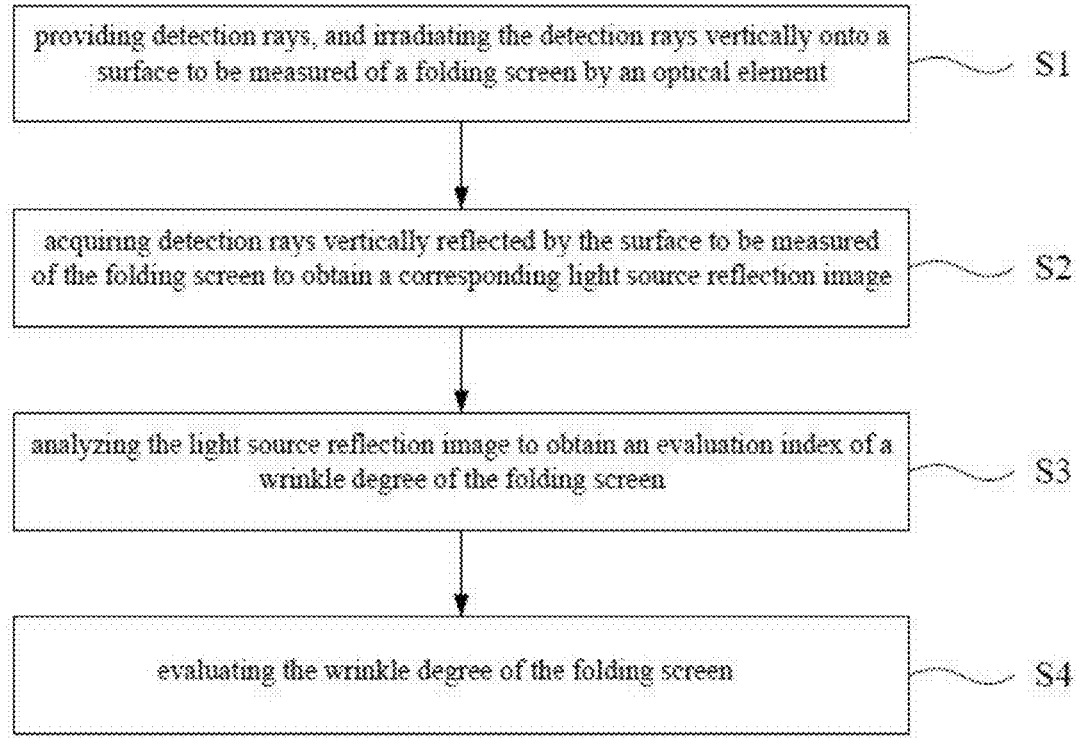
FIG. 2 is a first flowchart of a detection method of a wrinkle degree of a screen according to an embodiment of the present application.

In an embodiment, please refer to FIG. 2, FIG. 2 shows a first flowchart of a detection method of a wrinkle degree of a screen according to an embodiment of the present application. As shown in FIG. 2, the detection method includes:
 S1: providing detection rays, and irradiating the detection rays vertically onto a surface to be measured of a folding screen by an optical element;
 S2: acquiring the detection rays vertically reflected from the surface to be measured of the folding screen to obtain a corresponding light source reflection image;
 S3: analyzing the light source reflection image to obtain an evaluation index of the wrinkle degree of the folding screen;
 S4: evaluating the wrinkle degree of the folding screen.

By the optical element, a detection light path of the detection rays is changed to vertically irradiate the folding screen, so as to simulate the application scene of the human eyes observing the folding screen from a front; an image algorithm analysis is performed on the acquired light source reflection image to obtain a corresponding evaluation index of a wrinkle degree of the folding screen, and then the wrinkle degree of the folding screen is evaluated. The evaluation index of the wrinkle degree obtained in the embodiment of the present application matches the visual effect of human eyes, which solves the problem that the conventional measurement method of the wrinkle degree of the folding screen does not match the visual perception result of human eyes in the scene of frontal observation.

In an embodiment, the optical element is a beam splitter.

Please refer to FIG. 1, in step S1, a step of irradiating the detection rays vertically onto a surface to be measured of a folding screen by an optical element includes:
 irradiating the beam splitter with the detection rays; wherein all the detection rays are irradiated to the beam splitter.

A beam splitter is used to transmit part of the detection rays, and a remaining part of the detection rays are reflected to the folding screen; wherein the detection rays reflected to the folding screen is perpendicular to the surface to be measured of the folding screen.

Wherein the detection rays reflected to the folding screen completely covers the folding screen to ensure a comprehensive detection of the wrinkle degree of an entire surface of the folding screen.

In the present embodiment, an irradiating path of the detection rays is changed by reflection action of the beam splitter, so that the detection rays can be vertically irradiated on the folding screen to be detected, which is suitable for a scene in which a viewer observes the screen from the front.

In an embodiment, an included angle of 45° is formed between the light emitting surface of the light source and the beam splitter, and an included angle of 45° is formed between the beam splitter and the folding screen to be detected, and the light emitting surface of the light source and the surface to be measured of the folding screen are parallel to each other. The detection rays are incident on the beam splitter at an angle of a half of the detection rays are transmitted through the beam splitter, another half of the detection rays are reflected by the beam splitter at an angle of 45° to the folding screen, and the detection rays reflected to the folding screen is perpendicular to the folding screen.

In other embodiments, the included angle between the light emitting surface of the light source and the beam splitter may be any other angles depending on actual detection requirement.

Please refer to FIG. 1, in the step S2, a step of acquiring the detection rays vertically reflected from the surface to be measured of the folding screen to obtain the corresponding light source reflection image includes:

the detection rays reflected to the surface to be measured of the folding screen is reflected back vertically to the beam splitter by the surface to be measured of the folding screen. In an embodiment of the present application, the detection rays irradiate the folding screen vertically, the detection rays are vertically reflected by the surface to be measured of the folding screen, and the detection rays reflected back by the surface to be measured of the folding screen reach the beam splitter again. The embodiment of the present application can simulate the light source irradiating the folding screen vertically, which is suitable for the condition of observing the wrinkles of the folding screen when the human eyes are looking at the folding screen from the front. In the embodiment of the present application, the folding screen is kept in a blank screen state, so as to avoid the interference of the light of the folding screen in the detection rays.

A part of the detection rays reflected back to the beam splitter are reflected by the beam splitter, and the remaining part of the detection rays reflected back to the beam splitter are transmitted. In an embodiment of the present application, the beam splitter uses a plane beam splitter, so that the irradiation angle of the detection rays transmitted through the beam splitter remains unchanged, the beam splitter is located between the camera and the folding screen to be detected, and the detection rays transmitted through the beam splitter will reach the camera.

The camera is used to acquire the detection rays transmitted through the beam splitter, and performs imaging based on the obtained detection rays to obtain a corresponding light source reflection image.

Similarly, in the above-described embodiment, the light emitting surface of the light source forms an included angle of 45° with the beam splitter, the surface to be measured of the folding screen forms an included angle of 45° with the beam splitter, and the light emitting surface of the light source and the surface to be measured of the folding screen are parallel to each other. Among the detection rays reaching the beam splitter, a half of the detection rays are reflected, and another half of the detection rays are refracted to be transmitted through the beam splitter.

Figure 3:
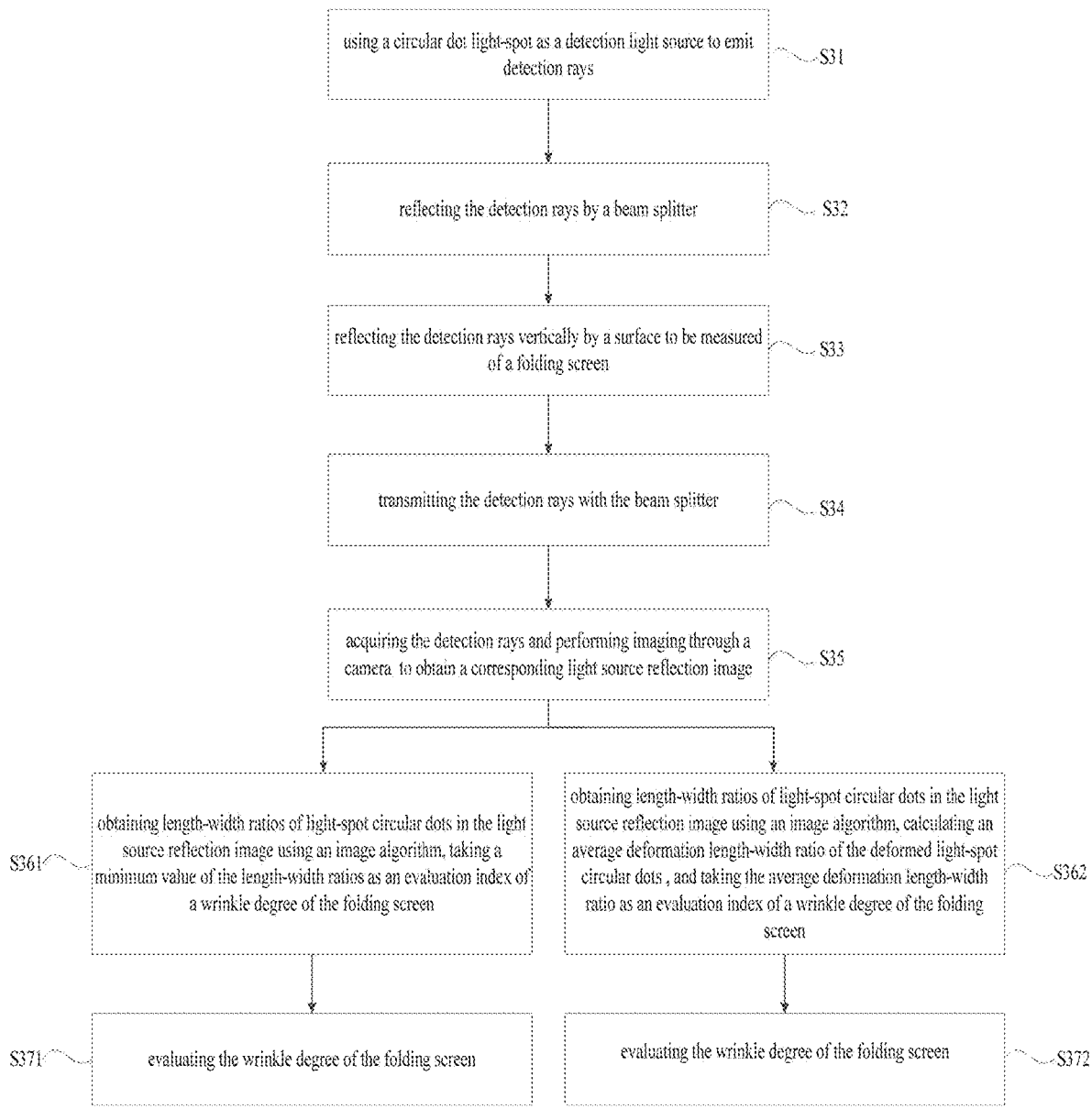
FIG. 3 is a second flowchart of a detection method of a wrinkle degree of a screen according to an embodiment of the present application.
Figure 6:
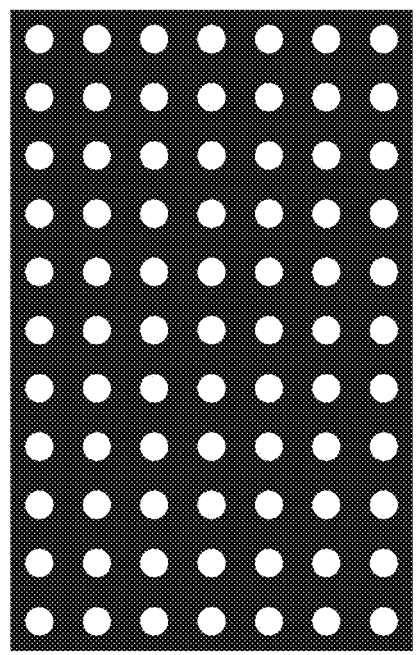
FIG. 6 is a schematic diagram of a first light source according to an embodiment of the present application.

In an embodiment, referring to FIG. 3, FIG. 3 shows a second flowchart of a detection method of a wrinkle degree of a screen according to an embodiment of the present application. As shown in FIGS. 3 and 1, the detection method includes:

S31: using a circular dot light-spot as a detection light source to emit detection rays. Wherein the detection rays propagate horizontally to the left as shown in FIG. 1. Referring to FIG. 6, FIG. 6 shows a schematic diagram of a first light source according to an embodiment of the present application, that is, a schematic diagram of a circular dot light-spot. In an embodiment of the present application, a radius of a light-spot circular dot of the circular dot light-spot ranges from 1 mm to 3 mm, and a minimum distance between two adjacent light-spot circular dots is 1 mm-3 mm.

S32: reflected the detection rays by the beam splitter. Referring to FIG. 1, the beam splitter is a plane beam splitter, and an included angle of 45° is formed between the surface of the plane beam splitter and the light emitting surface of the light source. Therefore, the detection rays are incident on the surface of the plane beam splitter at an incident angle of 45°. Of the detection rays irradiated onto the plane beam splitter, a half of the detection rays are reflected by the surface of the plane beam splitter, the reflection angle is 45°, the detection rays reflected by the surface of the plane beam splitter propagate downward, and another half of the detection rays are refracted to be transmitted through the beam splitter (not shown).

S33: reflecting the detection rays vertically by the surface to be measured of the folding screen. Referring to FIG. 1, an included angle between the surface of the folding screen and the surface of the planar beam splitter is 45°. Therefore, the detection rays reflected by the beam splitter illuminates the surface of the folding screen vertically downward, the detection rays perpendicularly incident are perpendicularly reflected by the surface of the folding screen, and the detection rays vertically reflected return to the beam splitter again upward. In an embodiment of the present application, the folding screen remains in the blank screen state to avoid the interference of the light of the folding screen in the detection rays.

S34: transmitting the detection rays using the beam splitter. Referring to FIG. 1, of the detection rays returned to the beam splitter again, a half of the detection rays are reflected by the surface of the plane beam splitter (not shown), and another half of the detection rays are refracted by the plane beam splitter to transmit through the plane beam splitter and propagate upward to the camera.

Figure 7:
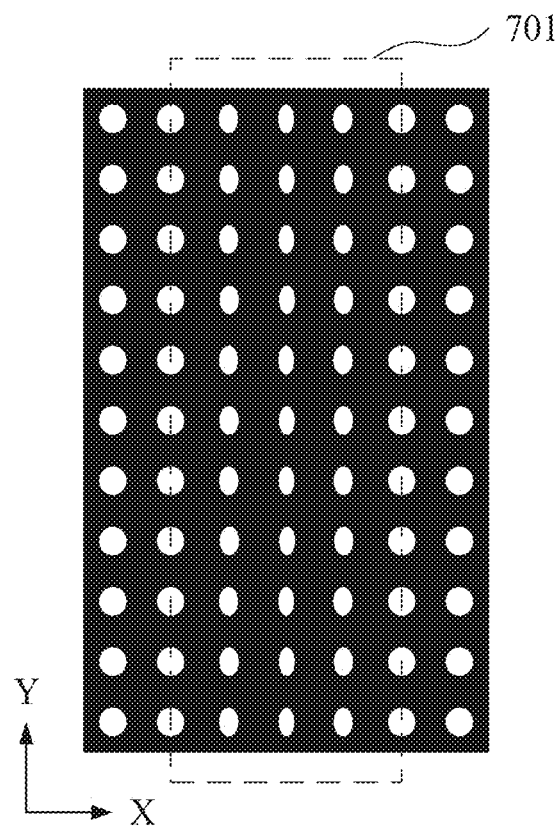
FIG. 7 is a schematic diagram of a first light source reflection image according to an embodiment of the present application.
Figure 8:
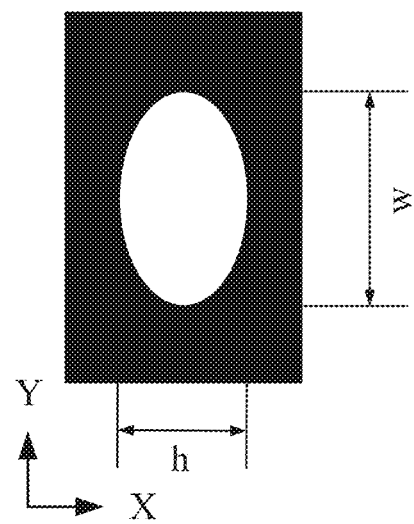
FIG. 8 is a partially enlarged schematic view of the light source reflection image of FIG. 7.

S35: acquiring the detection rays by the camera and performing imaging to obtain a corresponding light source reflection image. Referring to FIG. 1, the detection rays transmitted through the beam splitter reach the camera and are acquired by the camera to form a light source reflection image reflected by the folding screen. Referring to FIGS. 7 and 8, FIG. 7 shows a schematic diagram of a first light source reflection image according to an embodiment of the present application, and FIG. 8 is a partially enlarged schematic diagram of the light source reflection image in FIG. 7. A length of a light-spot circular dot is a maximum size of the light-spot circular dot in a direction X perpendicular to a creasing direction of the folding screen, and the width of the light-spot circular dot is a maximum size of the light-spot circular dot in a direction Y parallel to the crease direction of the folding screen. As shown in FIG. 8, the length of the light-spot circular dot is denoted as h, and the width of the light-spot circular dot is denoted as w, and a length-width ratio of the light-spot circular dot is h/w. As shown in FIGS. 7 and 8, in the folding area 701 of the folding screen, the length of the light-spot circular dot is compressed in the direction X perpendicular to the crease direction of the folding screen.

In an embodiment, S361: obtaining the length-width ratios of the light-spot circular dots in the light source reflection image using the image algorithm, and taking a minimum value of the length-width ratio as an evaluation index of the wrinkle degree of the folding screen. Wherein, the lower the minimum length-width ratio of the light-spot circular dots, the greater the wrinkle degree of the folding screen, and the higher the minimum length-width ratio of the light-spot circular dots, the lesser the wrinkle degree of the folding screen.

Referring to FIG. 13, FIG. 13 shows a fitting diagram of a length-width ratio of a light-spot circular dot and a human factor experiment according to the present embodiment. A fitting value $R^2=0.9014$, the fitting value is close to 1, which proves that the detection method of the wrinkle degree of the screen provided in this embodiment has a good match with the visual effect of human eye.

S371: evaluating the wrinkle degree of the folding screen. Referring to FIG. 13, when the score of physical human factor is 0, the folding screen has no wrinkle; when the score of the physical human factor is 0-3 (not including 0), the folding screen has slight wrinkles; when the score of the physical human factor is 3-6 (not including 3), the folding screen has more obvious wrinkles; when the score of the physical human factor is 6-10 (not including 6), the folding screen has serious wrinkles.

In the present embodiment, the circular dot light-spot is used as the detection light source, and the image algorithm analysis is performed on the light source reflection image reflected by the folding screen to obtain the minimum length-width ratio of the light-spot circular dots, which is an evaluation index of the wrinkle degree matching the visual effect of human eyes. In the present embodiment, the light path of the detection ray is changed by the beam splitter so that the detection ray is incident and reflected perpendicularly with respect to the folding screen, which is suitable for an application scene in which the human eye observes the folding screen from the front.

In another embodiment, S362: obtaining the length-width ratios of the light-spot circular dots in the light source reflection image using an image algorithm, calculating an average deformation length-width ratio of the deformed light-spot circular dots, and using the average deformation length-width ratio as an evaluation index of the wrinkle degree of the folding screen. Wherein the deformed light-spot circular dot is a circular dot of the light-spot whose length-width ratio is not 1, and the average deformation length-width ratio is an average value of the length-width ratios of the deformed light-spot circular dots. The smaller the value of the average deformation length-width ratio, the greater the wrinkle degree of the folding screen, and the larger the value of the average deformation length-width ratio, the lesser the wrinkle degree of the folding screen.

Referring to FIG. 14, FIG. 14 is a graph showing the variation of the light source reflection image and the average deformation length-width ratio with an increase of a number of bending (or folding). As the number of bending increases, the value of the average deformation length-width ratio gradually decreases, which proves that the detection method of the wrinkle degree of the screen provided in the present embodiment has a good match with the visual effect of human eyes.

S372: evaluating the wrinkle degree of the folding screen.

In the present embodiment, the circular dot light-spot is used as the detection light source, and the image algorithm analysis is performed on the light source reflection image reflected by the folding screen to obtain the average deformation length-width ratio of the light-spot circular dots, which is an evaluation index of the wrinkle degree matching the visual effect of human eyes. In the present embodiment, the light path of the detection ray is changed by the beam splitter so that the detection ray is incident and reflected perpendicularly with respect to the folding screen, which is suitable for an application scene in which the human eye observes the folding screen from the front.

Figure 4:
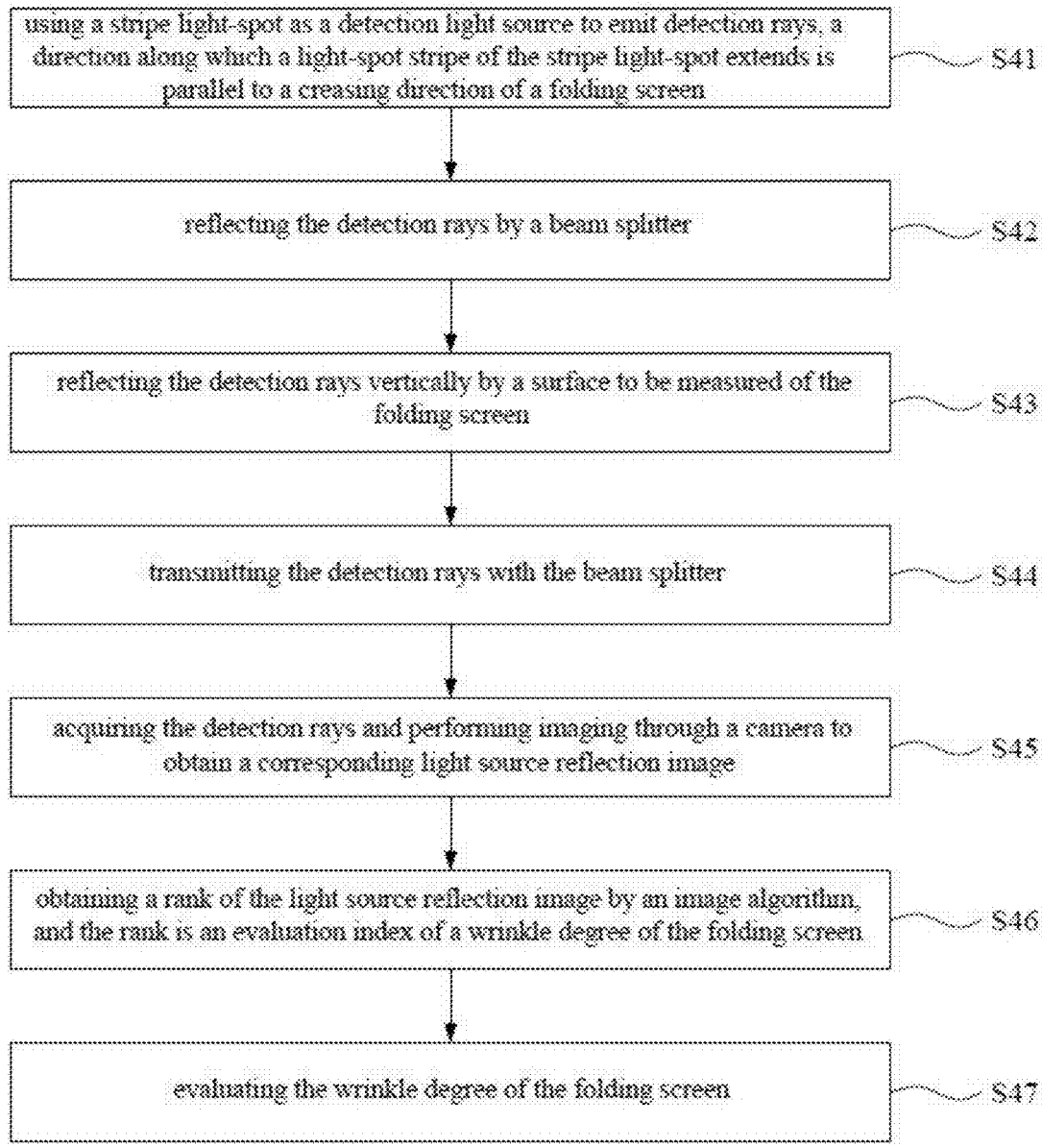
FIG. 4 is a third flowchart of a detection method of a wrinkle degree of a screen according to an embodiment of the present application.
Figure 9:
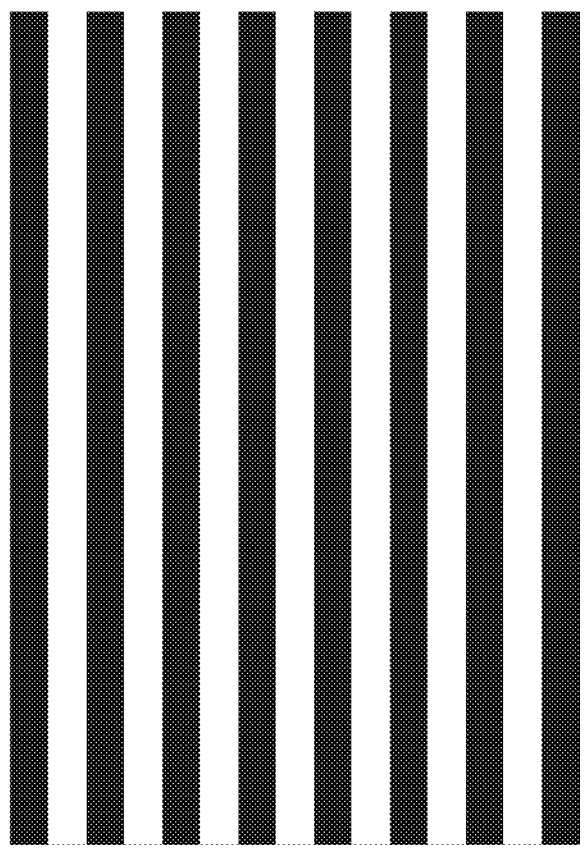
FIG. 9 is a schematic diagram of a second light source according to an embodiment of the present application.

In another embodiment, referring to FIG. 4, FIG. 4 shows a third flowchart of a detection method of a wrinkle degree of a screen according to an embodiment of the present application. As shown in FIGS. 4 and 1, the detection method includes:

S41: using a stripe light-spot as a detection light source to emit detection rays. A direction along which the light-spot stripe of the stripe light-spot extends is parallel to the creasing direction of the folding screen. Referring to FIG. 9, FIG. 9 shows a schematic diagram of a second light source according to an embodiment of the present application, that is, a schematic diagram of a stripe light-spot. In the embodiment of the present application, a size of the light-spot stripe of the stripe light-spot ranges from (1 mm×1 mm) to (3 mm×3 mm), and a gap between the light-spot stripes ranges from 1 mm to 3 mm.

S42: reflecting the detection rays by the beam splitter. Referring to FIG. 1, the beam splitter is a plane beam splitter, and an included angle of 45° is formed between the surface of the plane beam splitter and the light emitting surface of the light source. Therefore, the detection rays are incident on the surface of the plane beam splitter at an incident angle of 45°. Of the detection rays irradiated onto the plane beam splitter, a half of the detection rays are reflected by the surface of the plane beam splitter, the reflection angle is 45°, the detection rays reflected by the surface of the plane beam splitter propagate downward, and another half of the detection rays are refracted to be transmitted through the plane beam splitter (not shown).

S43: reflecting the detection rays vertically by the surface to be measured of the folding screen. Referring to FIG. 1, an included angle between the surface of the folding screen and the surface of the plane beam splitter is 45°. Therefore, the detection rays reflected by the beam splitter illuminates the surface of the folding screen vertically downward, the detection rays perpendicularly incident on the surface of the folding screen are perpendicularly reflected by the surface of the folding screen, and the detection rays vertically reflected return to the beam splitter again upward. In an embodiment of the present application, when the detection rays irradiate onto the folding screen, the direction along which the light-spot stripe extends is parallel to the creasing direction of the folding screen. In an embodiment of the present application, the folding screen remains in the blank screen state to avoid the interference of the light of the folding screen in the detection rays.

S44: transmitting the detection ray using the beam splitter. Referring to FIG. 1, of the detection rays returned to the beam splitter again, a half of the detection rays are reflected (not shown) by the surface of the plane beam splitter, and another half of the detection rays are refracted by the plane beam splitter to transmit through the plane beam splitter and propagate upward to the camera.

Figure 10:
FIG. 10 is a schematic diagram of a second light source reflection image according to an embodiment of the present application.

S45: acquiring the detection rays by the camera and performing imaging to obtain a corresponding light source reflection image. Referring to FIG. 1, the detection rays transmitted through the beam splitter reach the camera and are acquired by the camera to form a light source reflection image reflected by the folding screen. Referring to FIG. 10, FIG. 10 show a schematic diagram of a second light source reflection image according to an embodiment of the present application. As shown in FIG. 10, in a folding area 101 of the folding screen, in a direction X perpendicular to a creasing direction of the folding screen, the size of the light-spot stripe is deformed, and parameters of various light-spot stripes tend to be different.

Figure 11:
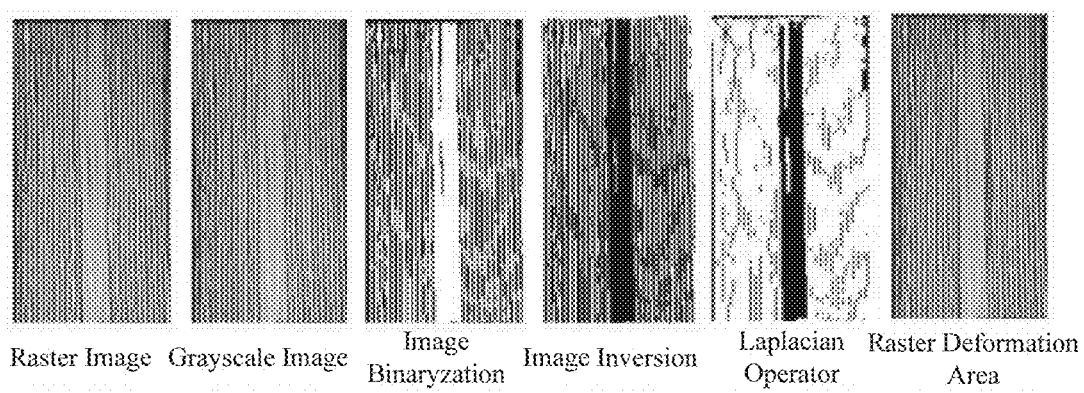
FIG. 11 is a conversion schematic diagram of a second light source reflection image according to an embodiment of the present application.

S46: obtaining a rank of the light source reflection image by the image algorithm. The rank is an evaluation index of the wrinkle degree of the folding screen. The rank represents a degree of information richness of the light-spot stripes. With the increase of the number of the bending of the folding screen, a creasing depth of the folding screen increases, a deformation degree of the light-spot stripes tends to be similar, and the parameters after the deformation of various light-spot stripes tend to be same. Therefore, the smaller a value of the rank, the greater the wrinkle degree of the folding screen, and the larger the value of the rank, the lesser the wrinkle degree of the folding screen. Referring to FIG. 11, FIG. 11 is a conversion schematic diagram of a second light source reflection image. As shown in FIG. 11, the rank of the light source reflection image is calculated by sequentially performing image conversion, such as raster images, grayscale images, image binarization, image inversion, Laplacian operators, raster deformation, etc., and a rank operation method.

Figures 15, 16:
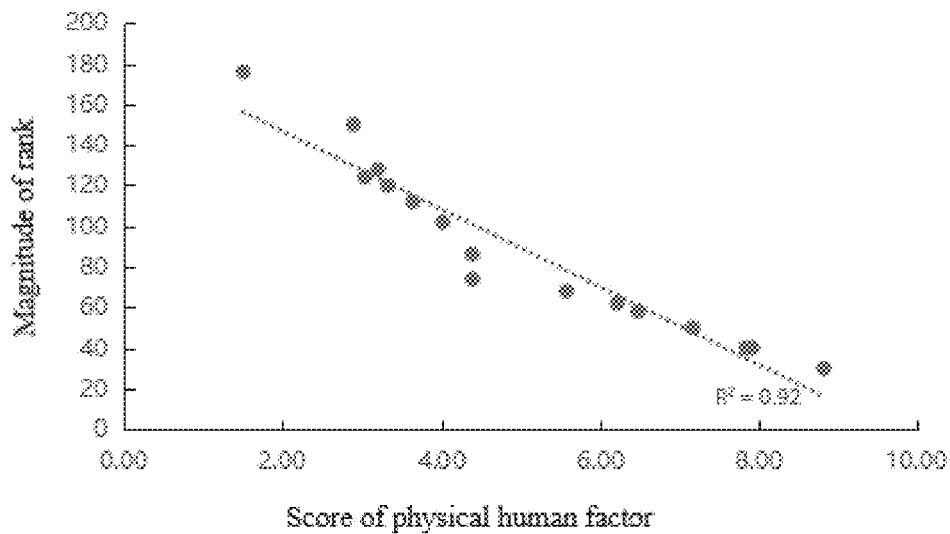
FIG. 15 is a fitting diagram of a second evaluation index of a wrinkle degree and a human factor experiment according to an embodiment of the present application.
FIG. 16 is a graph showing a variation of a second light source reflection image and an evaluation index of a wrinkle with an increase of a number of bending according to an embodiment of the present application.

Referring to FIGS. 15 and 16, FIG. 15 shows a fitting diagram of the rank of the light-spot stripe and human factor experiments according to the present embodiment, in which the fitting value $R^2=0.92$ and the fitting value is close to 1, which proves that the detection method of the screen wrinkle degree provided in this embodiment has a good match with the visual effect of human eyes. FIG. 16 is a graph showing the variation of the light source reflection image and the rank with the increase of the number of bending. As the number of bending increases, the value of the rank gradually decreases, and it is further proved that the detection method of the wrinkle degree of the screen provided in the present embodiment has a good match with the visual effect of human eye.

S47: evaluating the wrinkle degree of the folding screen. Referring to FIG. 15, when the score of the physical human factor is 0, the folding screen has no wrinkle; when the score of the physical human factor is 0-3 (not including 0), the folding screen has slight wrinkles; when the score of the physical human factor is 3-6 (not including 3), the folding screen has more obvious wrinkles; when the score of the physical human factor is 6-10 (not including 6), the folding screen has serious wrinkles.

In the present embodiment, the stripe light-spot is used as the detection light source, the extending direction of the light-spot stripe of the stripe light-spot is parallel to the creasing direction of the folding screen, and an image algorithm analysis is performed on the light source reflection image reflected by the folding screen to obtain the rank of the light-spot stripe which is an evaluation index of the wrinkle degree matching the visual effect of human eyes. Similarly, in the present embodiment, the light path of the detection ray is changed by the beam splitter so that the detection ray is incident and reflected perpendicularly with respect to the folding screen, which is suitable for an application scene in which the human eye observes the folding screen from the front.

Figure 5:
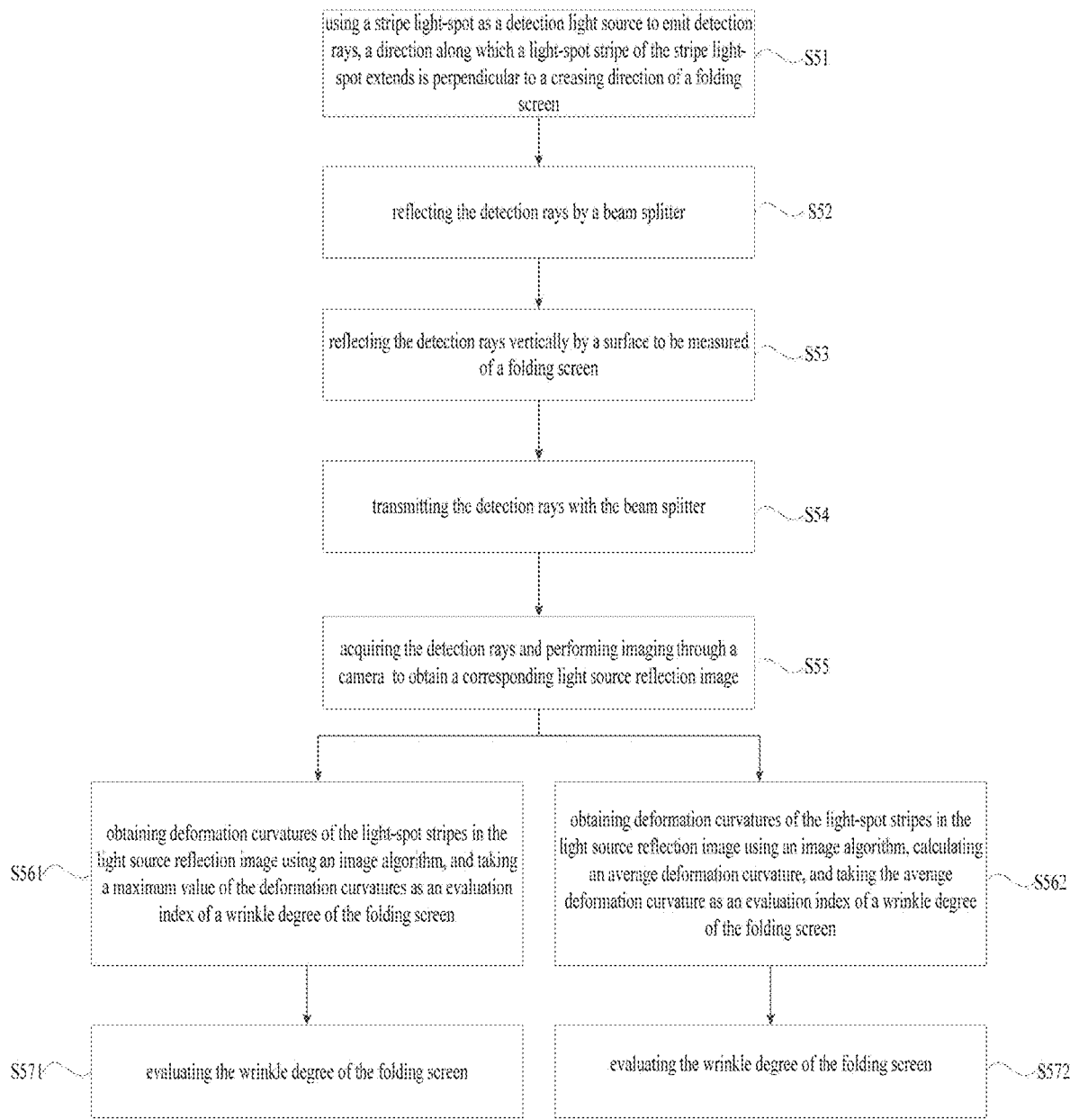
FIG. 5 is a fourth flowchart of a detection method of a wrinkle degree of a screen according to an embodiment of the present application.

In still another embodiment, referring to FIG. 5, FIG. 5 shows a fourth flowchart of a detection method of a wrinkle degree of a screen according to an embodiment of the present application. As shown in FIGS. 5 and 1, the detection method includes:

S51: using a stripe light-spot as a detection light source to emit detection rays. A direction along which the light-spot stripe of the stripe light-spot extends is perpendicular to the creasing direction of the folding screen. Referring to FIG. 9, FIG. 9 shows a schematic diagram of a second light source according to an embodiment of the present application, that is, a schematic diagram of a stripe light-spot. In the embodiment of the present application, a size of the light-spot stripe of the stripe light-spot ranges from (1 mm×1 mm) to (3 mm×3 mm), and a gap between the light-spot stripes ranges from 1 mm to 3 mm.

S52: reflecting the detection rays by the beam splitter. Referring to FIG. 1, the beam splitter is a plane beam splitter, and an included angle of 45° is formed between the surface of the plane beam splitter and the light emitting surface of the light source. Therefore, the detection rays are incident on the surface of the plane beam splitter at an incident angle of 45°. Of the detection rays irradiated onto the plane beam splitter, a half of the detection rays are reflected by the surface of the plane beam splitter, the reflection angle is 45°, the detection rays reflected by the surface of the plane beam splitter propagate downward, and another half of the detection rays are refracted to be transmitted through the plane beam splitter (not shown).

S53: reflecting the detection rays vertically by the surface to be measured of the folding screen. Referring to FIG. 1, an included angle between the surface of the folding screen and the surface of the plane beam splitter is 45°. Therefore, the detection rays reflected by the beam splitter illuminates the surface of the folding screen vertically downward, the detection rays perpendicularly incident on the surface of the folding screen are perpendicularly reflected by the surface of the folding screen, and the detection rays vertically reflected return to the beam splitter again upward. In an embodiment of the present application, when the detection rays irradiate onto the folding screen, the direction along which the light-spot stripe extends is perpendicular to the creasing direction of the folding screen. In an embodiment of the present application, the folding screen remains in the blank screen state to avoid the interference of the light of the folding screen in the detection rays.

S54: transmitting detection ray using the beam splitter. Referring to FIG. 1, of the detection rays returned to the beam splitter again, a half of the detection rays are reflected (not shown) by the surface of the plane beam splitter, and another half of the detection rays are refracted by the plane beam splitter to transmit through the plane beam splitter and propagate upward to the camera.

S55: acquiring the detection rays by the camera and performing imaging to obtain a corresponding light source reflection image. Referring to FIG. 1, the detection rays transmitted through the beam splitter reach the camera and are acquired by the camera to form a light source reflection image reflected by the folding screen. Referring to FIG. 12, FIG. 12 shows a schematic diagram of a third light source reflection image according to an embodiment of the present application. As shown in FIG. 12, in a folding area 121 of a folding screen, a light-spot stripe is bent and deformed.

In an embodiment, S561: obtaining deformation curvatures of the light-spot stripes in the light source reflection image using the image algorithm, and taking a maximum value of the deformation curvatures as an evaluation index of the wrinkle degree of the folding screen. Specifically, the deformation curvature of the light-spot stripe is calculated by an arc differential algorithm. Wherein, the deformation curvature of the light-spot stripe is a rotation rate of a tangential direction angle of a certain point on the light-spot stripe with respect to an arc length, indicating a degree to which the light-spot stripe curve deviates from a straight line, and a numerical value of the deformation curvature is a numerical value of a bending degree of the light-spot stripe curve at a certain point. The larger the value of the maximum deformation curvature, the greater the wrinkle degree of the folding screen, and the smaller the value of the maximum deformation curvature, the lesser the wrinkle degree of the folding screen.

Figure 17:
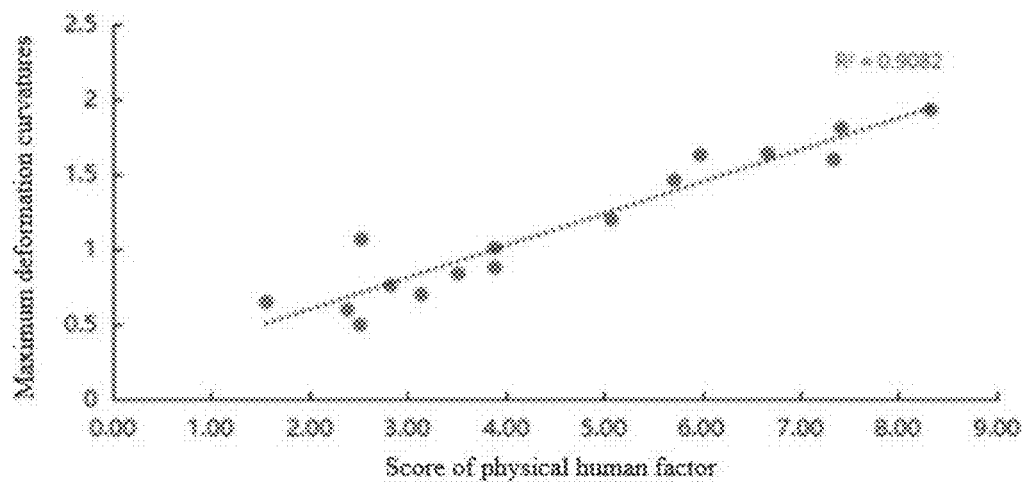
FIG. 17 is a fitting diagram of a third evaluation index of a wrinkle degree and a human factor experiment according to an embodiment of the present application.

Referring to FIG. 17, FIG. 17 shows a fitting diagram of the maximum deformation curvature of the light-spot stripes and the human factor experiment according to the present embodiment, in which the fitting value $R^2=0.9082$, and the fitting value is close to 1, which proves that the detection method of the screen wrinkle degree provided in this embodiment has a good match with the visual effect of human eyes.

In the present embodiment, the stripe light-spot is used as the detection light source, the extending direction of the light-spot stripe of the stripe light-spot is perpendicular to the creasing direction of the folding screen, and an image algorithm analysis is performed on the light source reflection image reflected by the folding screen to obtain the maximum deformation curvature of the light-spot stripes which is an evaluation index of the wrinkle degree matching the visual effect of human eyes. Similarly, in the present embodiment, the light path of the detection ray is changed by the beam splitter so that the detection ray is incident and reflected perpendicularly with respect to the folding screen, which is suitable for an application scene in which the human eye observes the folding screen from the front.

S571: evaluating the wrinkle degree of the folding screen. Referring to FIG. 17, when the score of the physical human factor is 0, the folding screen has no wrinkle; when the score of the physical human factor is 0-3 (not including 0), the folding screen has slight wrinkles; when the score of the physical human factor is 3-6 (not including 3), the folding screen has more obvious wrinkles; when the score of the physical human factor is 6-10 (not including 6), the folding screen has serious wrinkles.

In an embodiment, S562, obtaining the deformation curvatures of the light-spot stripes in the light source reflection image using an image algorithm, calculating the average deformation curvature, and using the average deformation curvature as an evaluation index of the wrinkle degree of the folding screen. The larger the value of the average deformation curvature, the greater the wrinkle degree of the folding screen, the smaller the value of the average deformation curvature, and the lesser the wrinkle degree of the folding screen.

Figure 18:
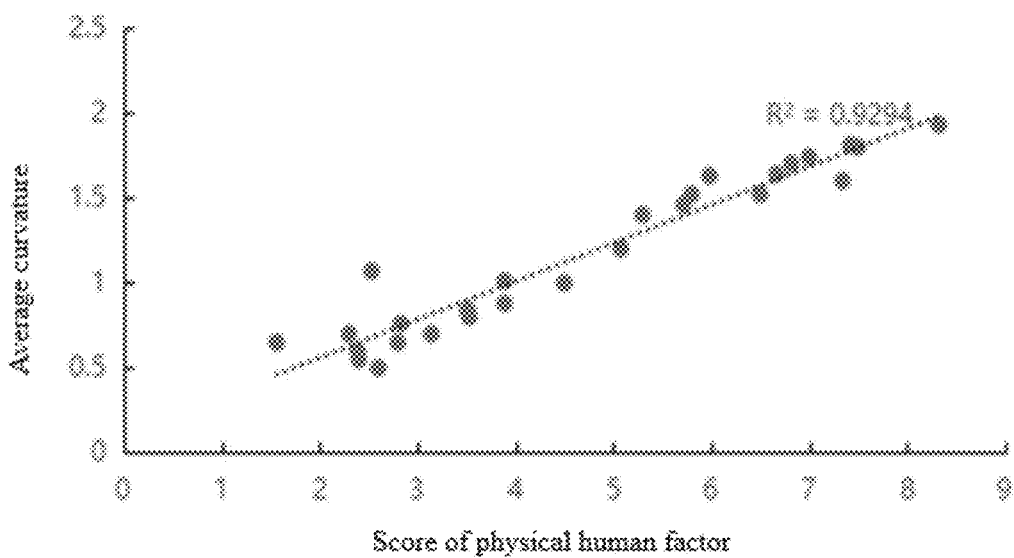
FIG. 18 is a fitting diagram of a fourth evaluation index of a wrinkle degree and a human factor experiment according to an embodiment of the present application.

Referring to FIG. 18, FIG. 18 shows a fitting diagram of the average deformation curvature of light-spot stripes and a human factor experiment according to the present embodiment. The fitting value $R^2=0.9294$, the fitting value is close to 1, which proves that the detection method of the screen wrinkle degree provided in this embodiment has a good match with the visual effect of human eyes.

S572: evaluating the wrinkle degree of the folding screen. Referring to FIG. 18, when the score of the physical human factor is 0, the folding screen has no wrinkle; when the score of the physical human factor is 0-3 (not including 0), the folding screen has slight wrinkles; when the score of the physical human factor is 3-6 (not including 3), the folding screen has more obvious wrinkles; when the score of the physical human factor is 6-10 (not including 6), the folding screen has serious wrinkles.

In the present embodiment, the stripe light-spot is used as the detection light source, the extending direction of the light-spot stripe of the stripe light-spot is perpendicular to the creasing direction of the folding screen, and an image algorithm analysis is performed on the light source reflection image reflected by the folding screen to obtain the average deformation curvature of the light-spot stripes which is an evaluation index of the wrinkle degree matching the visual effect of human eyes. Similarly, in the present embodiment, the light path of the detection ray is changed by the beam splitter so that the detection ray is incident and reflected perpendicularly with respect to the folding screen, which is suitable for an application scene in which the human eye observes the folding screen from the front.

In summary, an embodiment of the present application provides a detection method of a wrinkle degree of a screen and a visual detection device. The detection method includes: providing detection rays, and irradiating the detection rays vertically onto a surface to be measured of a folding screen by an optical element; acquiring the detection rays vertically reflected by the surface to be measured of the folding screen to obtain a corresponding light source reflection image; analyzing the light source reflection image to obtain an evaluation index of the wrinkle degree of the folding screen; evaluating the wrinkle degree of the folding screen. In the present application, the optical element is used to change the detection light path of the detection rays, so as to simulate the application scene of the human eyes observing folding screen from the front, an image algorithm analysis is performed on the acquired light source reflection image to obtain a corresponding evaluation index of the wrinkle degree of the folding screen, and then the wrinkle degree of the folding screen is evaluated. The evaluation index of the wrinkle degree obtained in the embodiment of the present application matches the visual effect of human eyes, which solves the problem that the conventional measurement method of the wrinkle degree of the folding screen does not match the visual perception result of human eyes in the scene of frontal observation.

The detection method of the wrinkle degree of the screen and the visual detection device provided in the embodiments of the present application are described in detail above. Specific examples are used in this article to illustrate the principles and implementations of the present disclosure. The description of the embodiments is merely intended to help understand the methods and core ideas of the present application. At the same time, a person skilled in the art may make changes in the specific embodiments and application scope according to the idea of the present application. In conclusion, the content of the specification should not be construed as a limitation to the present application.

What is claimed is:
1. A detection method of a wrinkle degree of a screen, wherein the detection method comprises following steps:

providing detection rays, and irradiating the detection rays vertically onto a surface to be measured of a folding screen using an optical element;

acquiring detection rays vertically reflected by the surface to be measured of the folding screen to obtain a corresponding light source reflection image;

analyzing the light source reflection image to obtain an evaluation index of the wrinkle degree of the folding screen; and evaluating the wrinkle degree of the folding screen, wherein a light source providing the detection rays is a circular dot light-spot; and wherein the step of analyzing the light source reflection image to obtain the evaluation index of the wrinkle degree of the folding screen comprises:

obtaining a length-width ratio of each of light-spot circular dots in the light source reflection image using an image algorithm; wherein a length of the light-spot circular dot is a maximum size of the light-spot circular dot in a direction perpendicular to a creasing direction of the folding screen, and a width of the light-spot circular dot is a maximum size of the light-spot circular dot in a direction parallel to the creasing direction of the folding screen; and taking a minimum value of the length-width ratios or an average deformation length-width ratio of deformed light-spot circular dots as the evaluation index of the wrinkle degree of the folding screen.

2. The detection method of the wrinkle degree of the screen according to claim 1, wherein the optical element is a beam splitter.

3. The detection method of the wrinkle degree of the screen according to claim 2, wherein the step of irradiating the detection rays vertically onto the surface to be measured of the folding screen using the optical element comprises:

irradiating the detection rays onto the beam splitter; and transmitting a portion of the detection rays with the beam splitter and reflecting a remaining portion of the detection rays to the folding screen; wherein detection rays reflected to the folding screen is perpendicular to the surface to be measured of the folding screen.

4. The detection method of the wrinkle degree of the screen according to claim 3, wherein the detection rays irradiate the beam splitter at an angle of 45°.

5. The detection method of the wrinkle degree of the screen according to claim 3, wherein the step of acquiring detection rays vertically reflected by the surface to be measured of the folding screen to obtain the corresponding light source reflection image comprises:

vertically reflecting the detection rays reflected to the folding screen back to the beam splitter using the surface to be measured of the folding screen;

reflecting, by the beam splitter, a portion of detection rays reflected back to the beam splitter, and transmitting, by the beam splitter, a remaining portion of the detection rays reflected back to the beam splitter; and acquiring, by a camera, the detection rays transmitted by the beam splitter, and imaging according to the acquired detection rays to obtain the corresponding light source reflection image.

6. The detection method of the wrinkle degree of the screen according to claim 1, wherein a radius size of a light-spot circular dot of the circular dot light-spot ranges from 1 mm to 3 mm, and a minimum distance between two adjacent light-spot circular dots ranges from 1 mm to 3 mm.

7. The detection method of the wrinkle degree of the screen according to claim 1, wherein the folding screen is in a blank screen state.

8. The detection method of the wrinkle degree of the screen according to claim 1, wherein a test environment is a dark state, a test temperature is 5° C. it 3° C., a test humidity is between 25% and 85%, and a test pressure is between 86 kPa and 106 kPa.

9. A visual detection device for implementing respective steps of a detection method of a wrinkle degree of a screen, wherein, the detection method of the wrinkle degree of the screen comprises:

providing detection rays, and irradiating the detection rays vertically onto a surface to be measured of a folding screen using an optical element;

acquiring detection rays vertically reflected by the surface to be measured of the folding screen to obtain a corresponding light source reflection image;

analyzing the light source reflection image to obtain an evaluation index of a wrinkle degree of the folding screen; and evaluating the wrinkle degree of the folding screen, the visual detection device comprises: a stage for carrying an object to be detected; a light source for providing detection rays;

a camera disposed above the stage for acquiring detection rays vertically reflected by a surface to be measured of the object; and an optical element for vertically irradiating the detection rays onto the surface to be measured of the object, wherein the light source comprises a circular dot light-spot and a stripe light-spot; and wherein the object is a folding screen, and a direction along which a light-spot stripe of the stripe light-spot extends is parallel to or perpendicular to a creasing direction of the folding screen.

10. The visual detection device according to claim 9, wherein the light source is provided above the stage, and an included angle of 45° is formed between a light emitting surface of the light source and the optical element.

11. The visual detection device according to claim 9, wherein the optical element is a beam splitter.

12. The visual detection device according to claim 11, wherein the beam splitter is a plane beam splitter.

13. A detection method of a wrinkle degree of a screen, wherein the detection method comprises following steps:

providing detection rays, and irradiating the detection rays vertically onto a surface to be measured of a folding screen using an optical element;

acquiring detection rays vertically reflected by the surface to be measured of the folding screen to obtain a corresponding light source reflection image;

analyzing the light source reflection image to obtain an evaluation index of the wrinkle degree of the folding screen; and evaluating the wrinkle degree of the folding screen, wherein a light source providing the detection rays is a stripe light-spot; and wherein the step of analyzing the light source reflection image to obtain the evaluation index of the wrinkle degree of the folding screen comprises one of:

obtaining a rank of the light source reflection image using an image algorithm; wherein the rank is the evaluation index of the wrinkle degree of the folding screen; and wherein a direction along which the light-spot stripe of the stripe light-spot extends is parallel to a creasing direction of the folding screen; and obtaining deformation curvatures of the light-spot stripes in the light source image by an image algorithm, wherein a direction along which the light-spot stripe of the stripe light-spot extends is perpendicular to a creasing direction of the folding screen; and extracting a maximum value or an average deformation curvature of the deformation curvatures as the evaluation index of the wrinkle degree of the folding screen.

14. The detection method of the wrinkle degree of the screen according to claim 13, wherein the optical element is a beam splitter.

15. The detection method of the wrinkle degree of the screen according to claim 14, wherein the step of irradiating the detection rays vertically onto the surface to be measured of the folding screen using the optical element comprises:

irradiating the detection rays onto the beam splitter; and transmitting a portion of the detection rays with the beam splitter and reflecting a remaining portion of the detection rays to the folding screen; wherein detection rays reflected to the folding screen is perpendicular to the surface to be measured of the folding screen.

16. The detection method of the wrinkle degree of the screen according to claim 15, wherein the detection rays irradiate the beam splitter at an angle of 45°.

17. The detection method of the wrinkle degree of the screen according to claim 15, wherein the step of acquiring detection rays vertically reflected by the surface to be measured of the folding screen to obtain the corresponding light source reflection image comprises:

vertically reflecting the detection rays reflected to the folding screen back to the beam splitter using the surface to be measured of the folding screen;

reflecting, by the beam splitter, a portion of detection rays reflected back to the beam splitter, and transmitting, by the beam splitter, a remaining portion of the detection rays reflected back to the beam splitter; and acquiring, by a camera, the detection rays transmitted by the beam splitter, and imaging according to the acquired detection rays to obtain the corresponding light source reflection image.

18. The detection method of the wrinkle degree of the screen according to claim 13, wherein the stripe light-spot has a size ranging from (1 mm×1 mm) to (3 mm×3 mm), and a gap between two adjacent light-spot stripes ranges from 1 mm to 3 mm.

19. The detection method of the wrinkle degree of the screen according to claim 13, wherein the folding screen is in a blank screen state.

20. The detection method of the wrinkle degree of the screen according to claim 13, wherein a test environment is a dark state, a test temperature is 5° C. it 3° C., a test humidity is between 25% and 85%, and a test pressure is between 86 kPa and 106 kPa.

* * * * *